(12) United States Patent
Grant et al.

(10) Patent No.: US 10,047,549 B2
(45) Date of Patent: Aug. 14, 2018

(54) LATCH

(75) Inventors: Robert Grant, Montreal (CA); Michael Block, Cote St. Luc (CA)

(73) Assignee: BOMBARDIER INC., Dorval, Quebec (CA)

( * ) Notice: Subject to any disclaimer, the term of this patent is extended or adjusted under 35 U.S.C. 154(b) by 288 days.

(21) Appl. No.: 14/116,096

(22) PCT Filed: May 11, 2012

(86) PCT No.: PCT/US2012/037456
§ 371 (c)(1),
(2), (4) Date: Nov. 6, 2013

(87) PCT Pub. No.: WO2012/155020
PCT Pub. Date: Nov. 15, 2012

(65) Prior Publication Data
US 2014/0062102 A1      Mar. 6, 2014

Related U.S. Application Data

(60) Provisional application No. 61/485,306, filed on May 12, 2011.

(51) Int. Cl.
*E05C 1/06* (2006.01)
*E05C 1/14* (2006.01)
(Continued)

(52) U.S. Cl.
CPC ............. *E05C 1/145* (2013.01); *E05B 5/00* (2013.01); *E05B 41/00* (2013.01); *E05B 59/00* (2013.01);
(Continued)

(58) Field of Classification Search
CPC ... E05C 1/004; E05C 1/10; E05C 1/04; E05C 1/06; E05C 1/065; E05C 1/145;
(Continued)

(56) References Cited

U.S. PATENT DOCUMENTS 590,418 A * 9/1897 Langford ................. 40/460
624,278 A * 5/1899 Whaley ................... 40/460
(Continued)

FOREIGN PATENT DOCUMENTS

CN     1015180 B     12/1991
EP     2236712 A2    10/2010
(Continued)

OTHER PUBLICATIONS

International Search Report and Written Opinion dated Sep. 23, 2013, for International Patent Application No. PCT/US2012/037456.
(Continued)

*Primary Examiner* — Christine M Mills
(74) *Attorney, Agent, or Firm* — Karceski IP Law, PLLC

(57) ABSTRACT

A latch includes a first locking bolt, where a first extended position of the first locking bolt defines a first locked condition and a first retracted position defines a first unlocked condition. The latch also includes a second locking bolt, where a second extended position of the second locking bolt defines a second locked condition and a second retracted position defines a second unlocked condition. A biasing member operatively connects to the first locking bolt to bias the first locking bolt in the first extended position. A lever pivotally connects to the housing and operatively connects to the first locking bolt such that movement of the lever from a closed position to an opened position causes at least the first locking bolt to move from the first extended position to the first retracted position. A locking indicator is provided in associated with the second locking bolt.

27 Claims, 13 Drawing Sheets

(51) Int. Cl.
*E05B 41/00* (2006.01)
*E05B 59/00* (2006.01)
*E05B 63/14* (2006.01)
*E05C 1/00* (2006.01)
*E05C 1/04* (2006.01)
*E05B 5/00* (2006.01)
*B64D 11/04* (2006.01)

(52) U.S. Cl.
CPC ............ *E05B 63/14* (2013.01); *E05C 1/004* (2013.01); *E05C 1/04* (2013.01); *E05C 1/065* (2013.01); *B64D 11/04* (2013.01); *Y10T 292/0967* (2015.04)

(58) Field of Classification Search
CPC .......... E05C 9/002; E05C 19/06; E05B 41/00; E05B 5/00; E05B 59/00; E05B 55/00; E05B 63/14; B64D 11/04; Y10T 292/0967
USPC ..... 292/32, 33, 40, 137, 157, 161, 163, 164, 292/138, 143, 302, 173, 175, 156, 292/DIG. 12, DIG. 31; 70/208, DIG. 59
See application file for complete search history.

(56) References Cited

U.S. PATENT DOCUMENTS

| | | | |
|---|---|---|---|
| 943,471 A * | 12/1909 | Schoell | 70/337 |
| 963,712 A * | 7/1910 | Jones | 70/438 |
| 3,881,331 A * | 5/1975 | Tranberg | E05B 59/00 70/107 |
| 3,936,084 A * | 2/1976 | Orr | 292/169.15 |
| 4,295,221 A | 10/1981 | Henoch et al. | |
| 4,295,674 A | 10/1981 | Duran | |
| 4,475,752 A | 10/1984 | McKenna | |
| 4,637,642 A | 1/1987 | Stoecker | |
| 4,828,299 A | 5/1989 | Poe | |
| 4,900,073 A * | 2/1990 | Doolan | 292/169.22 |
| 4,911,485 A | 3/1990 | Wasilewski | |
| 4,911,487 A | 3/1990 | Rachocki | |
| 5,570,915 A | 11/1996 | Asadurian | |
| 6,023,953 A * | 2/2000 | Vickers et al. | 70/208 |
| 6,050,618 A | 4/2000 | Tieu | |
| 6,322,114 B1 | 11/2001 | Kurachi et al. | |
| 6,460,902 B1 | 10/2002 | Kyle | |
| 6,499,775 B2 * | 12/2002 | Fujiwara | E05B 17/0045 292/137 |
| 6,578,888 B1 * | 6/2003 | Fayngersh et al. | 292/332 |
| 6,626,472 B1 * | 9/2003 | Berg | 292/336.3 |
| 6,669,250 B1 | 12/2003 | St. Louis | |
| 6,846,025 B2 * | 1/2005 | Sclater et al. | 292/336.3 |
| 6,848,728 B2 * | 2/2005 | Rotondi et al. | 292/336 |
| 7,083,205 B2 * | 8/2006 | Hall | 292/34 |
| 7,140,650 B2 | 11/2006 | Berg | |
| 7,152,892 B2 | 12/2006 | Rechberg | |
| 7,201,407 B2 | 4/2007 | Schlack | |
| D543,437 S | 5/2007 | Mallory et al. | |
| D565,931 S | 4/2008 | Samhammer et al. | |
| D567,064 S | 4/2008 | Samhammer et al. | |
| 7,367,597 B2 | 5/2008 | Rechberg | |
| 7,448,656 B1 | 11/2008 | Hein et al. | |
| 7,552,954 B2 * | 6/2009 | Rozo | E05B 5/00 292/143 |
| D596,920 S | 7/2009 | Cotton et al. | |
| 7,802,826 B2 | 9/2010 | Schmitz et al. | |
| 2004/0113432 A1 | 6/2004 | Hall | |
| 2008/0129054 A1 * | 6/2008 | Tremble | E05B 15/102 292/33 |
| 2008/0258477 A1 * | 10/2008 | Wagner | E05B 5/00 292/216 |
| 2009/0301146 A1 | 12/2009 | Jeffries | |
| 2010/0244465 A1 | 9/2010 | de Mola | |

FOREIGN PATENT DOCUMENTS

| | | |
|---|---|---|
| FR | 673911 A | 1/1930 |
| WO | WO 99/29991 | 6/1999 |
| WO | WO 02/35040 A1 | 5/2002 |

OTHER PUBLICATIONS

Chinese Office Action dated Mar. 23, 2015, for Chinese Patent Application No. 201280023044.5.
Chinese Office Action dated Sep. 23, 2015, for Chinese Patent Application No. 201280023044.5.

* cited by examiner

LATCH

CROSS-REFERENCE TO RELATED APPLICATION(S)

This is a National Stage Entry into the United States Patent and Trademark Office from International PCT Patent Application No. PCT/US2012/037456, having an international filing date of May 11, 2013, which relies for priority on U.S. Provisional Patent Application Ser. No. 61/485,306, filed on May 12, 2011, the entire contents of both of which are incorporated herein by reference.

FIELD OF THE INVENTION

The present invention concerns a latch that may be used in the interior of an aircraft. Among other deployments, the latch mechanism may be used to secure a door in an aircraft galley, for example.

DESCRIPTION OF THE RELATED ART

The prior art includes several examples of latches that are designed specifically for use on aircraft.

As should be apparent to those skilled in the art, devices employed in an aircraft environment are required to comply with various regulations worldwide that prescribe features unique to aircraft. One such requirement is that devices on aircraft must incorporate redundant features, among others. These requirements, therefore, place demands on components employed in aircraft that are somewhat unique for these vehicles.

In addition, the mobile nature of aircraft places a need for latches that are able to secure doors, for example, sometimes under conditions that such latches would not experience in a more static environment.

As should be apparent to those skilled in the art, latches that are used on aircraft are required to keep doors closed during normal operation. They are also required to be secured during take-off and landing. As a result, latches that are used on aircraft incorporate both a mechanism permitting a user to secure the door during normal use but also to lock the door so that the latch does not inadvertently open during take-off and landing, when the door is subjected to potentially greater dynamic forces than are experienced during steady state conditions.

Prior art latches include latches of the type that are described, for example, in U.S. Pat. No. 6,050,618 (hereinafter "the '618 patent"). The latch described in the '618 patent is a sliding-action, slam latch. (The '618 patent at col. 2, lines 2-5.) The latch 10 is mounted to a door 100 and is designed to engage a frame 120. (The '618 patent at col. 3, lines 8-14.)

U.S. Pat. No. 6,499,775 (hereinafter "the '775 patent") describes what may be recognized as a door latch that is used widely on many aircraft in operation today. The latch 100 includes a slidable bolt 130 and a rotating knob 140. (The '775 patent at col. 2, lines 44-53.) When the knob 140 is oriented parallel to the bolt 130, the latch is locked. When the knob 140 is oriented perpendicularly to the bolt 130, the latch 100 is openable. The latches 100 typically are employed in pairs to provide a double-locking mechanism for a door. (See, e.g., the '775 patent at FIG. 2.)

U.S. Pat. No. 7,201,407 (hereinafter "the '407 patent") describes a sliding panel latch 100. The latch 100 is disposed in a panel 102. (The '407 patent at col. 2, lines 34-35.) The latch 100 includes a lever 110 that is manually manipulated to permit opening and closing of the panel 102. (The '407 patent at col. 5, lines 44-55.)

U.S. Pat. No. 7,552,954 (hereinafter "the '954 patent") describes a toggle switch for securing an overhead compartment in an aircraft. (The '954 patent at col. 2, lines 34-39.) The latch may include an indicator to show if the latch is not properly latched. (The '954 patent at col. 3, lines 1-2.)

U.S. Pat. No. Des. 567,064 illustrates a slam latch with a deadbolt, the operation of which cannot be readily understood from the design drawings.

Simple operation and construction are always a concern for any aircraft designer. While prior art latches have a proven track record, there has developed a desire for latches with a simplified operation and construction.

SUMMARY OF THE INVENTION

The present invention seeks to address one or more deficiencies that are present in latch mechanisms known in the prior art.

As such, the present invention provides a latch that includes a housing. A first locking bolt is disposed within the housing. The first locking bolt has a first locking end and a first interior end. The first locking end is extendible to a first extended position and is retractable to a first retracted position. The first extended position defines a first locked condition and the first retracted position defines a first unlocked condition. The latch also includes a second locking bolt disposed within the housing. The second locking bolt has a second locking end and a second interior end, wherein the second locking end is extendible to a second extended position and is retractable to a second retracted position. The second extended position defines a second locked condition and the second retracted position defines a second unlocked condition. A biasing member is operatively connected to the first locking bolt to bias the first locking bolt in the first extended position. A lever is pivotally connected to the housing and operatively connected to the first locking bolt. Movement of the lever from a closed position to an opened position causes the first locking bolt to move from the first extended position to the first retracted position. A locking indicator is connected to the second locking bolt.

In one embodiment, the locking indicator is revealed when the second locking bolt is in at least one of the second retracted position or the second extended position and the locking indicator is concealed when the second locking bolt is in at least one of the second extended position or the second retracted position.

In another embodiment, the locking indicator is revealed when the second locking bolt is in the second retracted position and the locking indicator is concealed when the second locking bolt is in the second extended position.

In one contemplated embodiment of the present invention, movement of the lever from the closed position to the opened position also causes the second locking bolt to move from the second extended position to the second retracted position.

It is also contemplated that release of the lever, when at the opened position, permits the biasing member to return the first locking bolt to the first extended position from the first retracted position.

Also, release of the lever when at the opened position also permits the biasing member to return the lever from the opened position to the closed position.

In an embodiment of the present invention, the second locking bolt is movable between the second extended position and the second retracted position by applying pressure to the locking indicator.

It is contemplated that the locking indicator may be connected to the second interior end of the second locking bolt such that the locking indicator defines a locking surface and an unlocking surface, both of which are accessible by a person to permit application of pressure to the locking indicator.

In this embodiment, application of pressure to the locking surface causes the second locking bolt to move to the extended position and application of pressure to the unlocking surface causes the second locking bolt to move to the second retracted position.

The locking indicator may include visual indicia highlighting when the locking indicator is in the second retracted position.

It is contemplated that the locking indicator will be concealed in the second retracted position because the locking indicator is visibly occluded by the lever when the lever is in the closed position.

In one contemplated embodiment, the first locking bolt and the second locking bolt are disposed adjacent to one another in substantially parallel relation to one another.

In another contemplated embodiment, the first locking bolt is movable from the first extended position toward the first retracted position by application of pressure to the first locking end.

The first locking bolt may operate as a slam latch, permitting the first locking bar to removably engage a surface adjacent thereto.

The second locking bolt, when in the second extended position, is contemplated to prevent disengagement of the latch even if the lever is moved to the opened position.

The latch may be disposable in a door and the first and second locking ends are engageable with a frame adjacent to the door.

In one contemplated embodiment, the latch may be disposable in a frame such that the first and second locking ends are engageable with a door adjacent thereto.

It is contemplated that the biasing member may be connected between the first locking bolt and the housing adjacent to the first interior end.

The biasing member may be an elastic member of any type, as should be apparent to those skilled in the art.

The elastic member is a spring, at least in one contemplated embodiment of the present invention.

In an embodiment of the present invention, the first locking end extends through the housing when in the first extended position and the second locking end extends through the housing when in the second extended position.

In one contemplated embodiment, the housing is cup shaped.

The present invention also provides for a method of operating a double-locking latch between a locked position and an unlocked position. The method includes applying pressure to a lever to move the lever from a closed position to an opened position, by operation of the lever, retracting first and second locking bolts from locked positions to unlocked positions, and after releasing the lever, permitting a biasing member return the first locking bolt to the locked position while the second locking bolt remains in the unlocked position.

In one contemplated embodiment the method includes an operation where the second locking bolt is moved from the unlocked position to the locked position by application of pressure thereto.

Other aspects of the present invention will be made apparent from the discussion and the drawings herein.

BRIEF DESCRIPTION OF THE DRAWINGS

The present invention will now be described in connection with the drawings appended hereto, in which.

DETAILED DESCRIPTION OF EMBODIMENT(S) OF THE PRESENT INVENTION

The present invention will now be described in connection with one or more embodiments thereof. The embodiments described herein are intended to be illustrative of the present invention. Discussion of any one particular embodiment is not intended to limit the present invention. To the contrary, those skilled in the art should readily appreciate that there are numerous equivalents and variations of the embodiments described herein that may be employed without departing from the scope of the present invention.

In the discussion of that follows, the latch of the present invention will be described in connection with the securement of a door for a cabinet or other structure within an aircraft. While designed with the doors of an aircraft galley in mind, the present invention should not be understood to be limited solely to this particular environment. It is contemplated that the latch may be employed for use in any other environment or on any other vehicle including, but not limited to, recreational vehicles, trains, trucks, and boats, among others. In other words, while the present invention is described in connection with use on cabinet door in an aircraft, the present invention is contemplated to be useable in a wide variety of environments.

Figure 1:
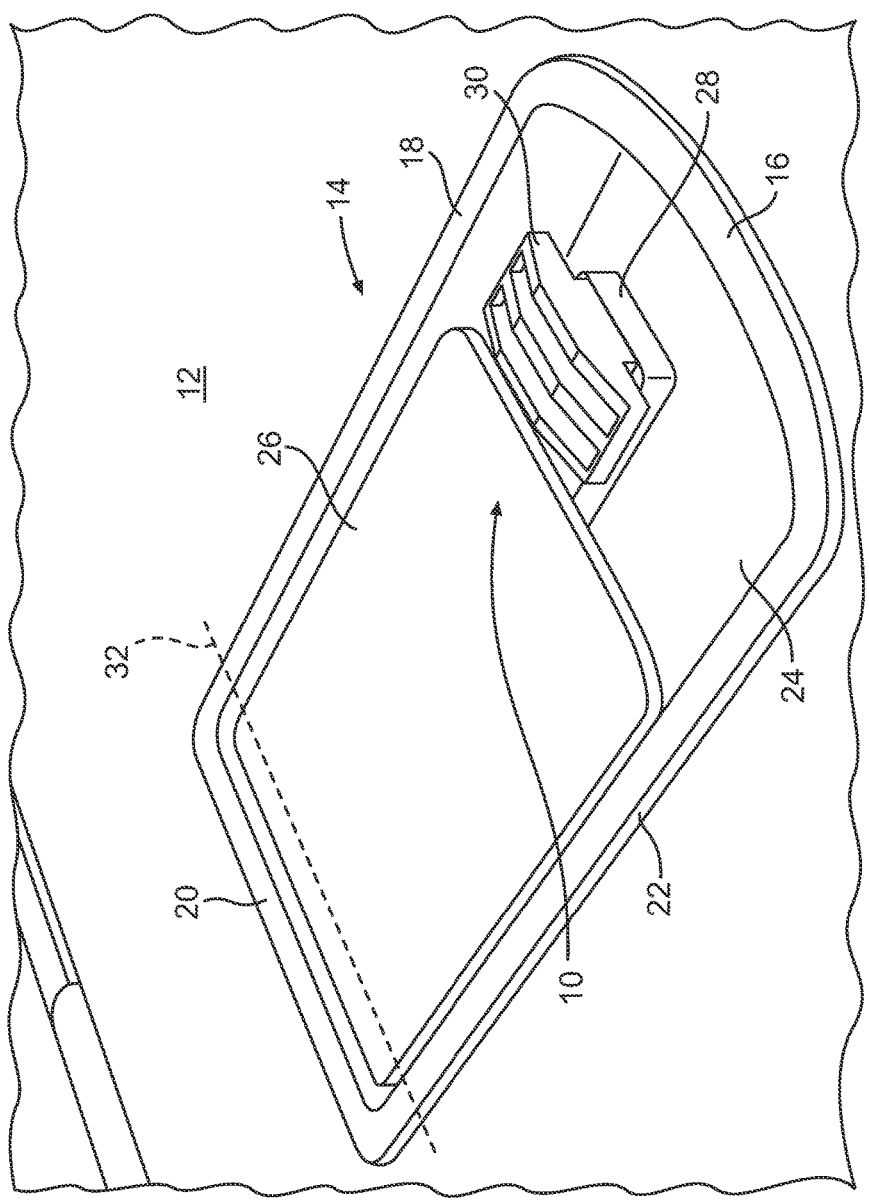
FIG. 1 is a perspective illustration of one embodiment of the latch of the present invention.

FIG. 1 is a perspective illustration of one contemplated embodiment of the latch 10 of the present invention.

As noted above, in the discussion that follows, the latch 10 of the present invention is described in connection with the securement of a door 12, such as a door 12 that one would typically find the in the galley of an aircraft. As also noted, this is one contemplated environment for the latch 10 of the present invention. Discussion of the latch 10 for use on an aircraft, therefore, is not intended to limit the present invention.

It is noted that the embodiments of the latch 10 of the present invention describe the positioning of the latch on a door 12. In this contemplated position, the latch is incorporated into the door 12 such that the latch engages a frame (or other structure) that surrounds the door 12. In an alternative arrangement, the latch 10 may be positioned in the frame surrounding the door 12, without departing from the scope of the present invention.

The latch 10 includes a housing 14. The housing 14 is essentially a rectangularly-shaped cup with a first, second, third, and fourth sides 16, 18, 20, 22. The housing 14 also includes a bottom 24. As should be apparent, the exact shape of the housing 14 is not critical to operation of the present invention. Accordingly, any other shape may be employed without departing from the scope of the present invention.

Since the latch 10 of the present invention is contemplated for use on an aircraft where weight is a consideration, it is contemplated that the components of the latch 10, including the housing 14, will be constructed from a light-weight material such as aluminum or an alloy of aluminum.

While aluminum is considered as the most likely material to be used for the components of the latch 10, other materials may be employed without departing from the scope of the present invention. For example, the components of the latch 10 may be made from any suitable metal including steel and its alloys. Alternatively, it is contemplated that the components of the latch 10 may be made from plastics, nylon, ceramics, or composite materials, to name a few other possibilities. The exact materials used for any of the components of the latch 10 are not critical to the construction and operation of the latch 10 of the present invention. As such, any suitable material may be used without departing from the scope of the present invention.

Returning to FIG. 1, the housing 14 is contemplated to be sunk into the surface of the door 12 such that the housing is flush with the surface of the door 12. While this arrangement is desirable because of the appearance of the latch 10 when mounted in this manner (among other reasons), the latch 10 of the present invention need not be mounted so that it is flush with the surface of the door 12. In alternative contemplated embodiments, the latch 10 may be sunk so that it is below the surface of the door 12. Alternatively still, the latch 10 may be mounted so that it protrudes above the surface of the door 12.

The latch 10 includes a lever 26. In FIG. 1, a locking bolt 28 is visible, together with an indicator 30, the details of which are provided below. The lever 26 is pivotally mounted in the housing 14 such that the lever 26 pivots around an axis 32, which is below the surface of the door 12, as should be apparent from the illustration.

Figure 2:
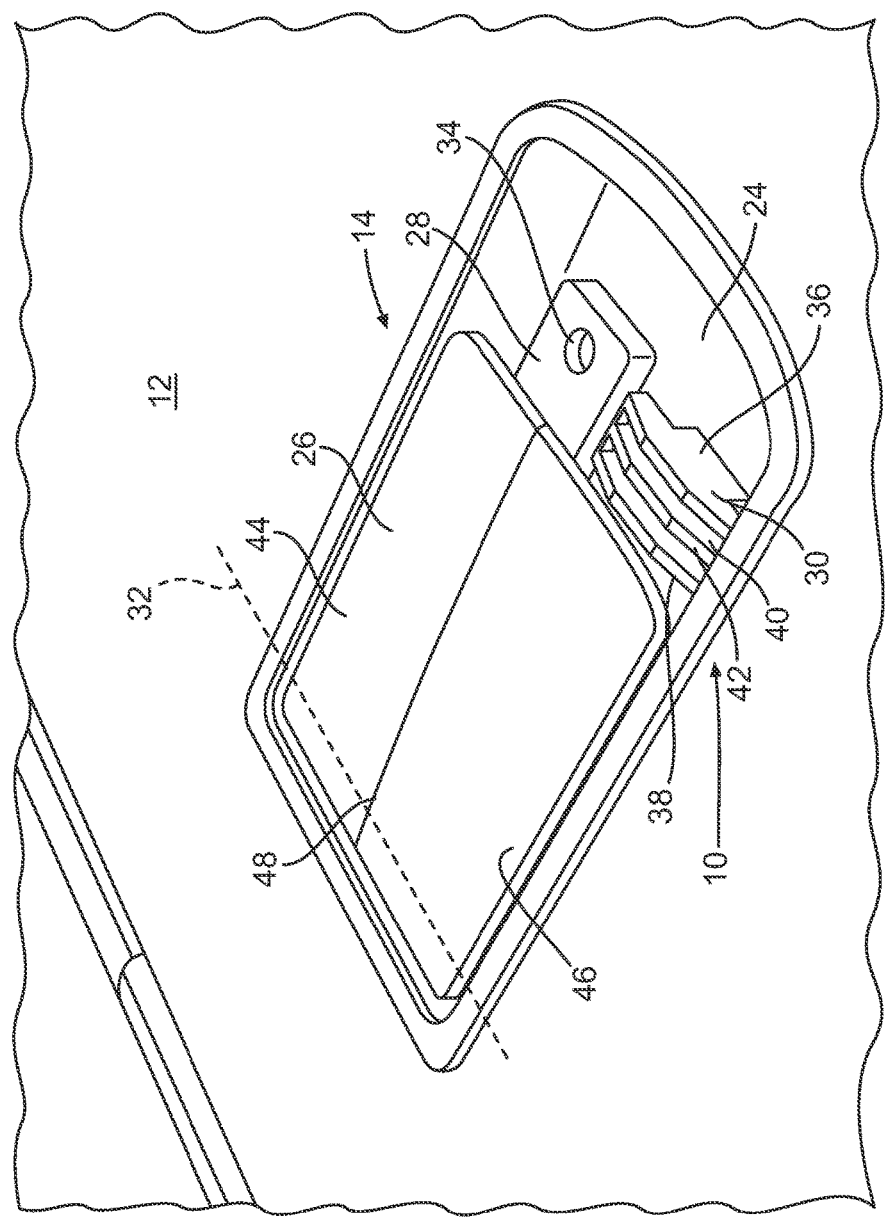
FIG. 2 is a perspective illustration of the embodiment of the latch of the present invention illustrated in FIG. 1, shown in a partially disassembled condition.

FIG. 2 is a perspective illustration of the latch 10 illustrated in FIG. 1. In this view, the indicator 30 has been removed from the locking bolt 28 and placed in the recess formed in the housing 14. This illustration is provided to indicate how the indicator 30 might be connected to the locking bolt 28. In this embodiment, it is contemplated that the indicator 30 is connected to the locking bolt 28 via a fastener (not shown) that extends through the hole 34 at the exposed end of the locking bolt 28. As should be apparent to those skilled in the art, the indicator 30 and the locking bolt 28 may be manufactured as integral components and need not be separable from one another.

In the drawings, the indicator 30 is shown as a rectangular structure with a front surface 36 and a rear surface 38. The front surface 36 also is referred to herein as the locking surface 36, because it facilitates locking of the latch 10 as discussed in greater detail below. The rear surface 38 also is referred to as the unlocking surface 38, because it facilitates unlocking of the latch 10, as also described in greater detail below. The top 40 of the indicator 30 includes several ridges 42.

The locking bolt 28 is provided with the indicator 30 such that a person may visually verify if the latch 10 is in a secure condition, the details of which are provided below. To assist visual verification, the indicator 30 may be provided with visual indicia that permit a rapid evaluation of the locked condition of the latch 10. For example, the indicator 30 may be painted a bright color, such as red. Alternatively, bright paint may be applied to the ridges 42 or between the ridges 42, as desired. When brightly marked, the bright markings are easily identified when the indicator 30 is revealed from beneath the lever 26, as illustrated in FIGS. 1 and 2. When the locking bolt 28 has been pushed toward the frame, the indicator 30 is concealed beneath the lever 26, thereby concealing the visual indicia.

FIG. 2 also provides an indication of one possible variation of the latch 10 of the present invention. Specifically, the latch 26 need not be a single structure, as illustrated in FIG. 1. To the contrary, the lever 26 may be separated into a first lever 44 and a second lever 46.

It is noted that the line 48 separating the indication of the levers 44, 46 is provided merely for illustration and is not actually a separating line in this drawing (and other drawings appended hereto). The line 48 in the drawing is merely a line that suggests the curvature of the surface of the lever 26. However, the line 48 provides an indication as to how the latch 10 of the present invention might be modified to produce one possible variation.

If the lever 26 is divided into two levers 44, 46, the levers 44, 46 may be actuated individually or in concert to release the locking bolts of the latch 10, as discussed in greater detail in connection with FIGS. 3-6.

Figure 3:
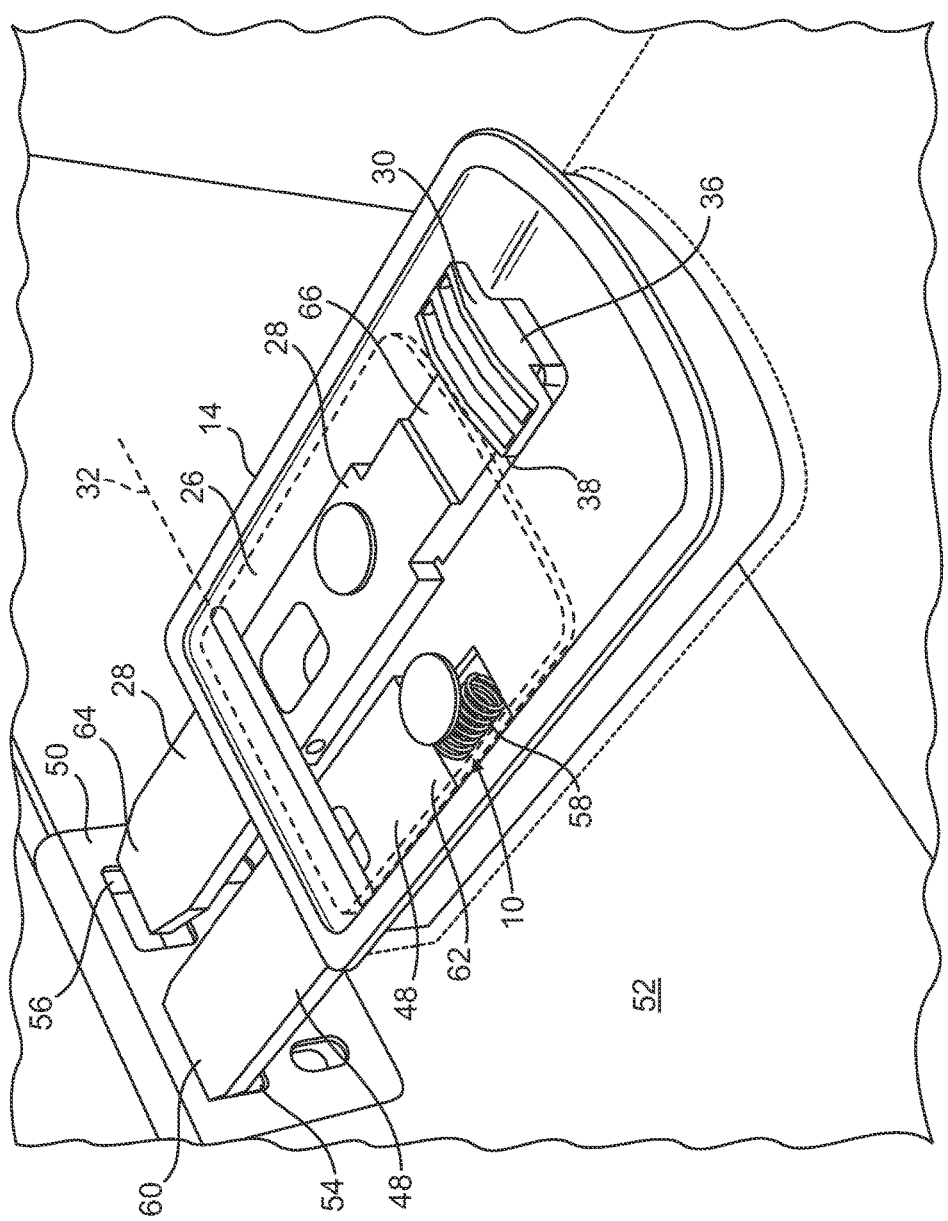
FIG. 3 is a perspective illustration of the embodiment of the latch of the present invention shown in FIG. 1, illustrating selected components of the latch and showing the latch in a partially locked condition.

FIG. 3 is a perspective detail of the components of the latch 10 illustrated in FIGS. 1 and 2. The housing 14, the lever 26, and the indicator 30 are the same as previously described.

As illustrated in FIG. 3, the latch 10 of the present invention includes two locking bolts 28, 48. For this reason, the latch 10 of the present invention also is referred to as a double-locking latch.

The locking bolts 28, 48 are disposed in a parallel arrangement within the housing 14. While shown in a parallel arrangement, it is noted that a parallel disposition of the locking bolts 28, 48 is not required to practice the present invention. The locking bolts 28, 48 may be disposed at angular or perpendicular orientations with respect to one another without departing from the scope of the present invention.

The locking bolts 28, 48 slide within the housing 14 between extended positions and retracted positions. In the extended positions, the locking bolts 28, 48 engage the locking plate 50 disposed on the frame 52 adjacent to the door 12 (see FIGS. 1 and 2). Specifically, the locking bolts 28, 48 engage the holes 54, 56 in the locking plate 50.

As illustrated in FIG. 3, the locking bolt 48 is spring loaded. In particular, the locking bolt 48 includes a spring 58 that is connected between the locking bolt 48 and the housing 14. The spring 58 biases the locking bolt 48 so that the exterior end 60 of the locking bolt 48 engages the hole 54 in the locking plate 50. For definitional purposes, the interior end 62 of the locking bolt 48 is designated. In addition, the exterior end 64 and the interior end 66 of the locking bolt 28 also are designated in FIG. 3.

As noted, the locking bolt 48 is spring loaded. As also noted, biasing of the locking bolt 48 is accomplished via the elastic member (or spring) 58. In the illustrated embodiment, the elastic member 58 is a coil spring 58. While a coil spring 58 is illustrated, any elastic member 58 may be employed without departing from the scope of the present invention.

As should be apparent from FIG. 3, the locking bolt 28 is not elastically disposed within the housing 14 so that the exterior end 64 of the locking bolt 28 engages the hole 56 in the locking plate 50. In other words, there is no bias applied to the locking bolt 28.

The operation of the latch 10 will now be described in connection with FIGS. 4-6.

Figure 4:
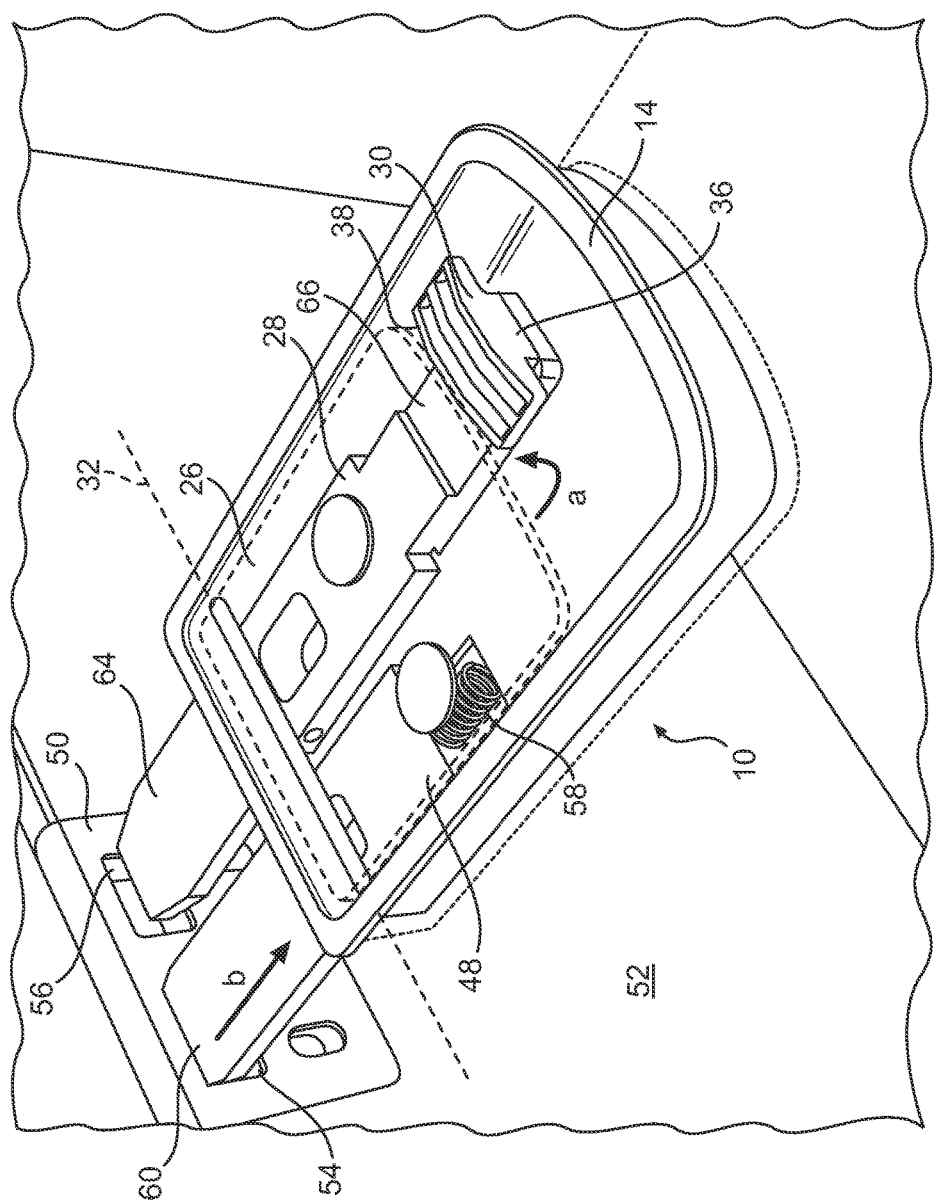
FIG. 4 is a perspective illustration of the embodiment of the latch of the present invention shown in FIG. 3, providing an indication concerning a first manipulation of the latch.

FIG. 4 illustrates the latch 10 in a state where the locking bolt 48 is elastically biased into engagement with the hole 54 in the locking plate 50. The locking bolt 28 is in a state where it is disengaged from the hole 56 in the locking plate 50. Accordingly, the latch 10 is in a partially locked condition, because only one of the two locking bolts 28, 48 engage the locking plate 50 in the frame 52 surrounding the door 12 in which the latch is positioned.

In this partially locked state, the latch 10 operates as a "slam latch." What this means is that the door 12 may be "slammed" shut such that the latch 10 will keep the door 12 in a closed position. This "slam latch" features is made possible, at least in part, due to the incorporation of the elastic member 58 into the latch 10.

When the door 12 is opened, a person may apply pressure to the door 12 to force the door 12 into a closed position without operating the lever 26 (or any other element of the latch 10). Because the locking bolt 48 is spring-loaded, the locking bolt 48 will move from its extended position into a retracted position. In other words, application of a force to the door 12 will cause the locking bolt 48 to be pushed in the direction of the arrow "b". Once the exterior end 60 of the locking bolt 48 clears the locking plate 50 and is moved into register with the hole 54, the spring 58 will push the locking bolt 28 into the hole 54, thereby causing the locking bolt 48 to engage the locking plate 50 in or on the frame 52.

To release the latch from the partially locked position, a person applies upward pressure onto the lever 26 to move the lever 26 from a closed position to an opened position. Since the lever 26 is operatively connected to the locking bolt 48, movement of the lever 26 to the opened position causes the locking bolt 48 to move to the retracted position, thereby disengaging the latch 10 from the locking plate 50. As illustrated, the arrow "a" indicates the movement of the lever 26 from the closed to the opened position.

Figure 5:
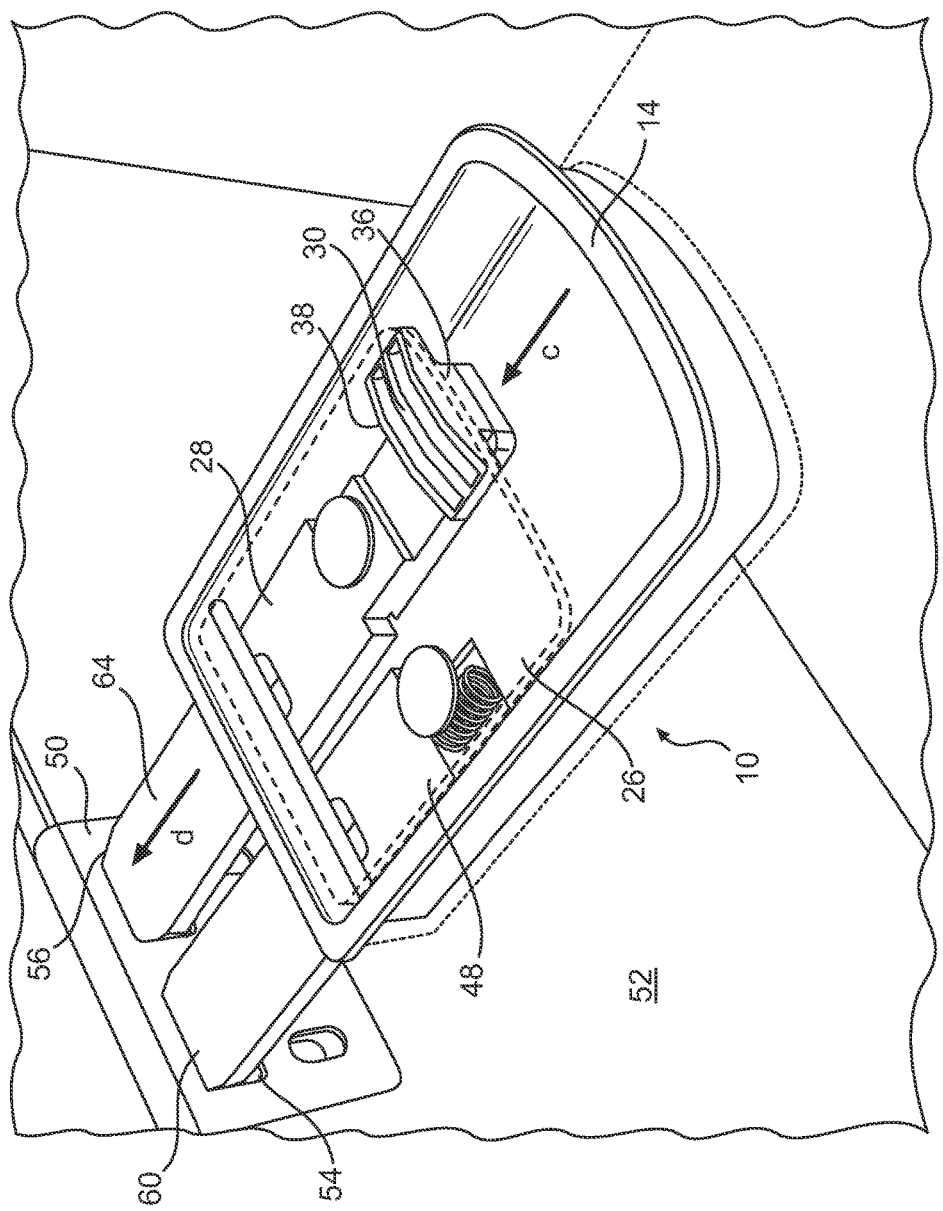
FIG. 5 is a perspective illustration of the embodiment of the latch of the present invention shown in FIG. 4, providing an indication of a second manipulation of the latch.

FIG. 5 illustrates the manner in which the latch 10 is placed into a fully locked (or double-locked) condition. Here, the locking bolt 28 is shown in an extended position, rather than the retracted position illustrated in FIG. 4. The locking bolt 48 also is shown in the extended position. As such, the exterior end 60 of the locking bolt 48 is in engagement with the hole 54 and the exterior end 64 of the locking bolt 28 is in engagement with the hole 56. Since both locking bolts 28, 48 are engaging the holes 54, 56 in the locking plate 50, the latch 10 is double-locked, as identified above.

Since the locking bolt 28 is not spring-biased into any particular position, to engage the locking bolt 28 into the hole 56, pressure is applied by a person on the front or locking surface 36 of the indicator 30 in the direction indicated by the arrow "c". This causes the locking bolt 28 to move in the direction of the arrow "d." As should be apparent, once the locking bolt 28 has been moved to the extended position (as illustrated in FIG. 5), the exterior end 64 of the locking bolt 28 engages the hole 56, which locks the latch 10.

As also is apparent in FIG. 5, when the locking bolt 28 has been moved to the extended (or locked) position, the indicator 30 is concealed beneath the lever 26. As a result, any highlighting or indicia that readily identify the indicator 30 are concealed from view. This differs from the FIG. 4, where the indicator is revealed from beneath the lever 26, thereby exposing any indicia for quick identification by a person.

Figure 6:
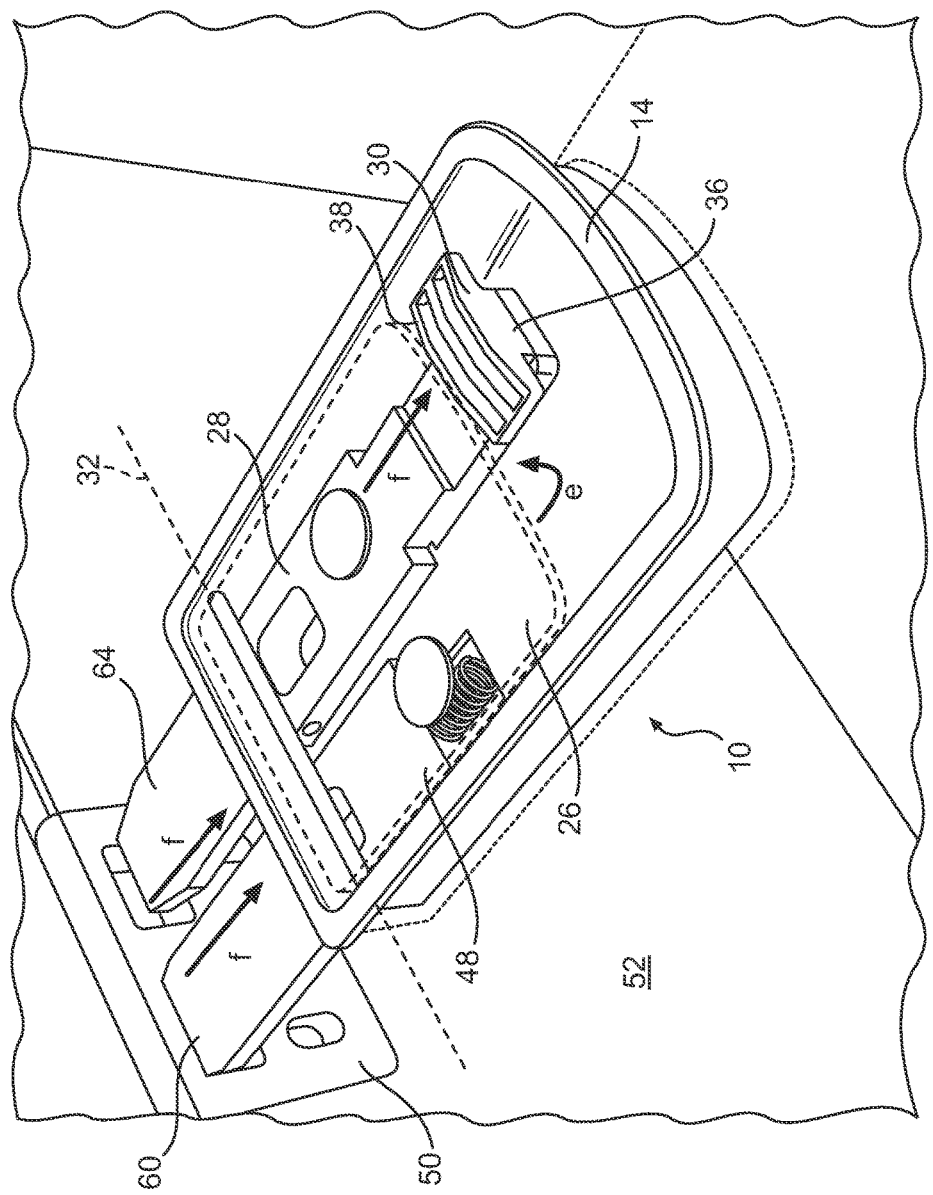
FIG. 6 is a perspective illustration of the embodiment of the latch of the present invention shown in FIG. 5, providing an indication of a third manipulation of the latch.

FIG. 6 illustrates how the latch is opened from the double-locked position. Specifically, to unlock the latch 10 from the double-locked condition, a person merely lifts up on the lever 26, as indicated by the arrow "e." The lever 26 is operatively connected to both locking bolts 28, 48 such that both locking bolts 28, 48 will disengage from the locking plate 50 simultaneously. Movement of the locking bolts 28, 48 is indicated by the arrow "f."

As should be apparent, after the locking bolts 28, 48 are disengaged from the locking plate 50 and the person releases the lever 26, the elastic member 58 acts to bias the lever 26 into the closed position. Simultaneously, the elastic member 58 biases the locking bolt 48 into the extended position. Accordingly, after the latch 10 is opened from its double-locked condition and the person releases the lever 26, the latch 10 behaves as a slam latch. As noted above, when the door 12 is slammed shut, the locking bolt 48 will hold the door 12 in the closed position.

In one variation to the latch 10 described above, it is contemplated that the latch 10 may operate such that the locking bolt 28 is operated only manually. In other words, it is contemplated that the locking bolt 28 may not be operatively connected to the lever 26 so that the locking bolt 28 moves to the retracted position when the lever 26 is lifted to the opened position.

For this variation, it is contemplated that the lever 26 will unlock the locking bolt 48 from the locking plate 50. A person would then be required to apply pressure onto the rear or unlocking surface 38 of the indicator to pull the locking bolt 28 into the retracted position, thereby moving it into the unlocked position.

Figure 7:
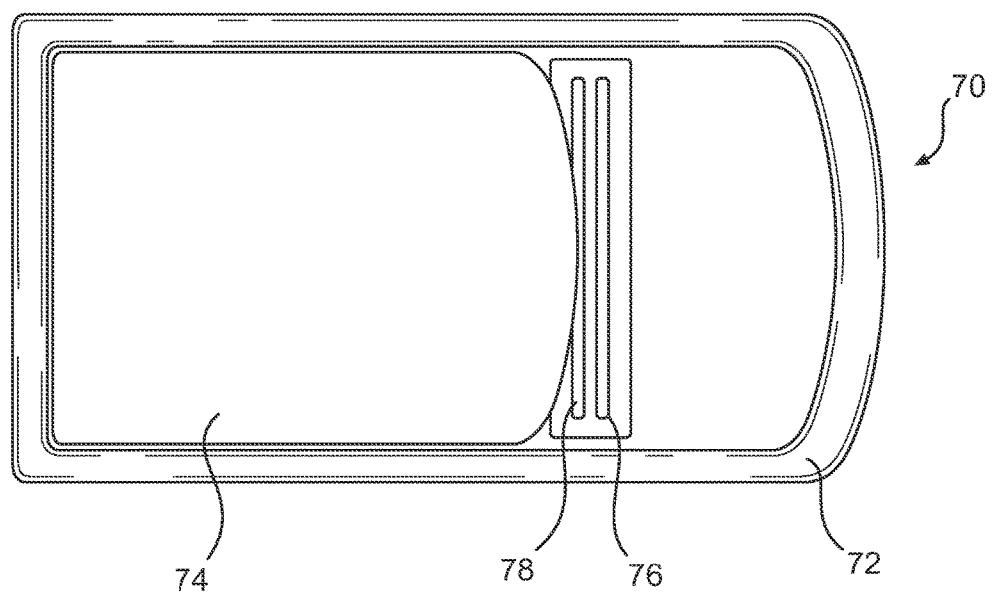
FIG. 7 is a top view of another embodiment of the latch of the present invention.

FIG. 7 is a top view of another contemplated embodiment of a latch 70. The latch 70 is similar to the latch 10. The latch 70 includes a housing 72 with a lever 74. The latch 70 is attached to the housing 72 and is pivotable from a closed position (shown) to an opened position (not shown). The latch 70 is understood to be a double-lock latch like the latch 10 discussed above. The latch 70 includes an indicator 76 that differs from the indicator 30 discussed above. In this embodiment, the indicator 76 extends across the width of the housing 72, rather than only a part of the width of the housing 72. The indicator 76 is illustrated as containing highlighted areas 78, which are highlighted with a bright color, such as red.

Figure 8:
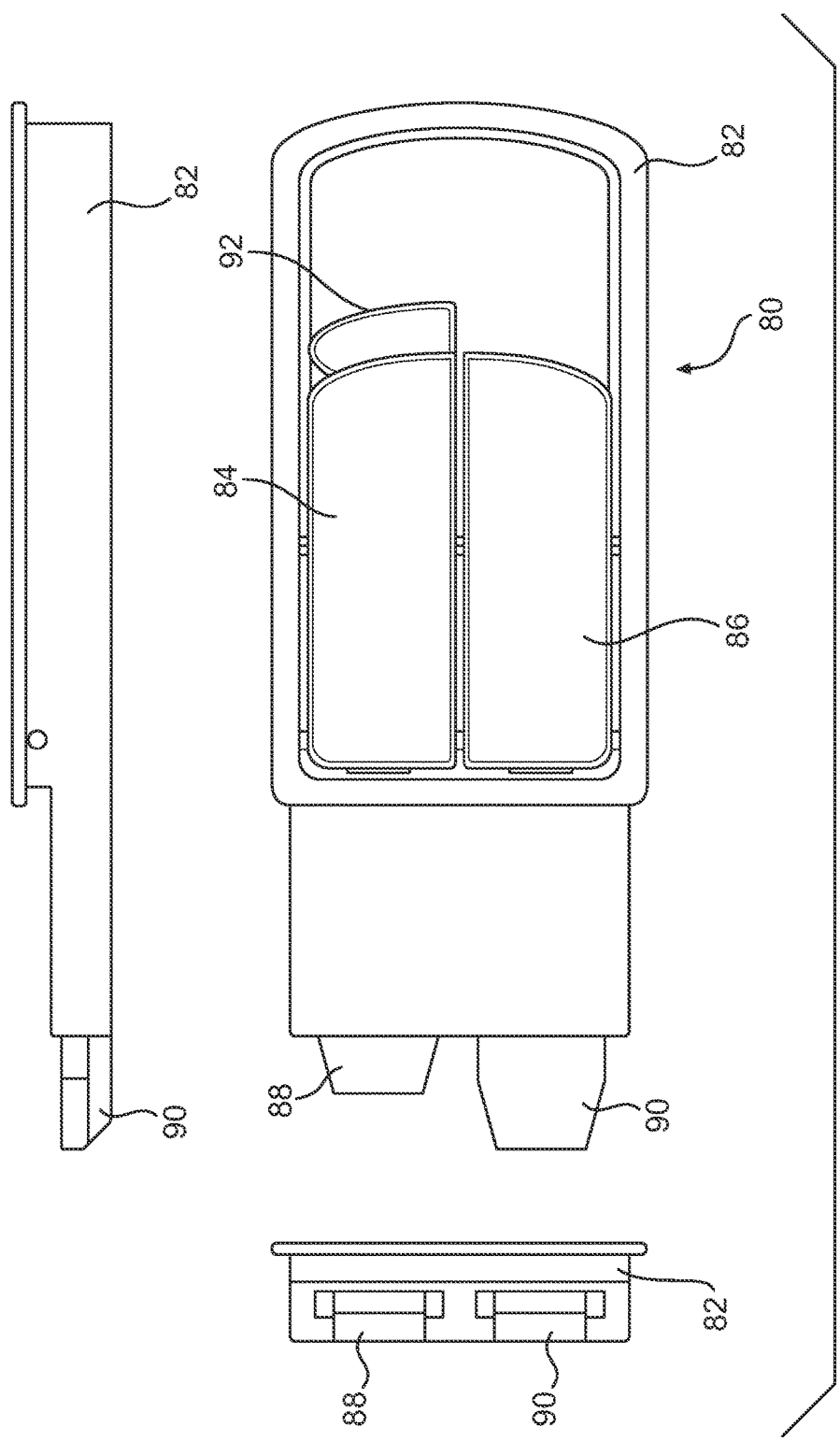
FIG. 8 combines top, side and end views of a further embodiment of the latch of the present invention.

FIG. 8 illustrates another embodiment of a latch 80. In this embodiment, the latch 80 also includes a housing 82, similar to the housing 14 described in connection with the latch 10. In this embodiment, there are two levers 84, 86 that are operatively connected to first and second locking bolts 88, 90. The latch 80 also include an indicator 92 disposed at the interior end of the first locking bolt 88. In this embodiment, the first locking bolt 88 is not elastically biased in the housing 82. The second locking bolt 90 is elastically positioned within the housing 82. This arrangement is similar to (or the same as) the disposition of the first and second locking bolts 28, 48 described in connection with the latch 10.

The latch 80 operates much in the same way as the latch 10. However, instead of a single lever 26, the latch 80 includes a first lever 84 that is operatively connected to the first locking bolt 88. The latch 80 also includes a second lever 86 that is operatively connected to the second locking bolt 90. In this embodiment of the latch 80, the levers 84, 86 operate independently from one another.

Figure 9:
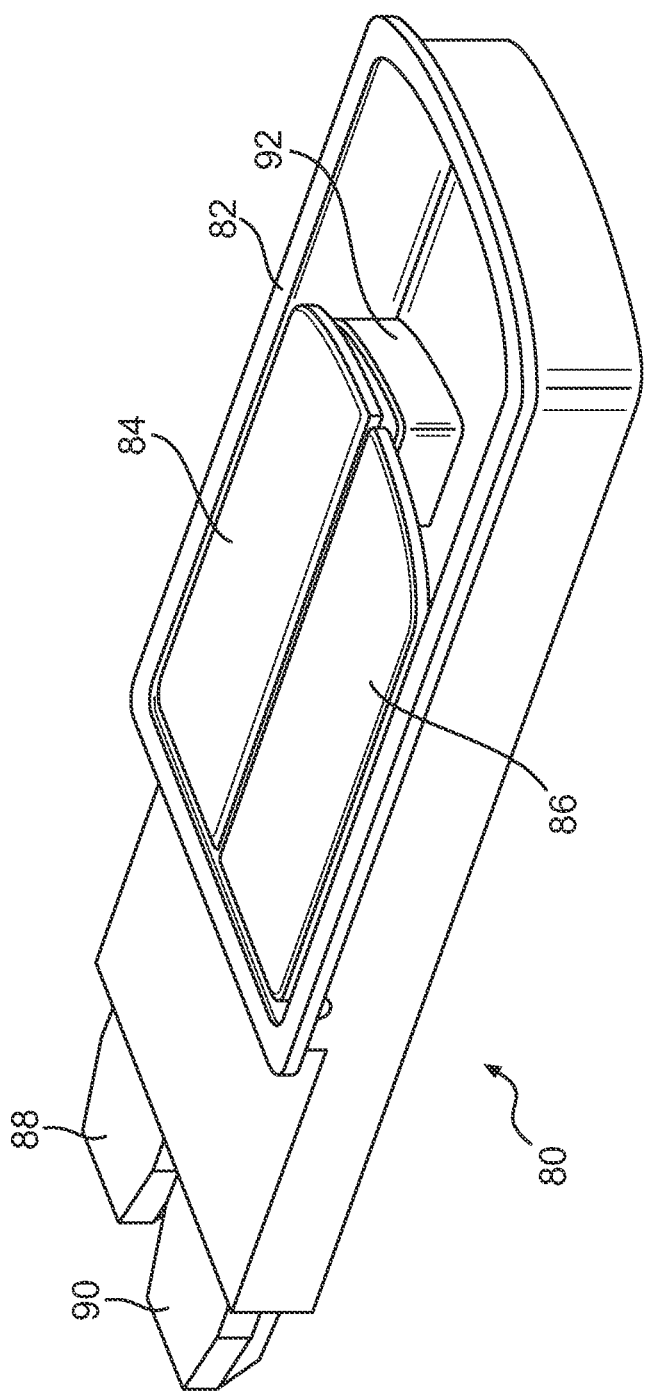
FIG. 9 is a perspective illustration of the latch shown in FIG. 8, with the indicator in a concealed position.

FIG. 9 illustrates the latch 80, which is shown in FIG. 8. In this view, both the first and second locking bolts 88, 90 are in their extended positions. This indicates that the latch 80 is in a double-locked condition. As shown, the indicator 92 is concealed beneath the first lever 84.

Figure 10:
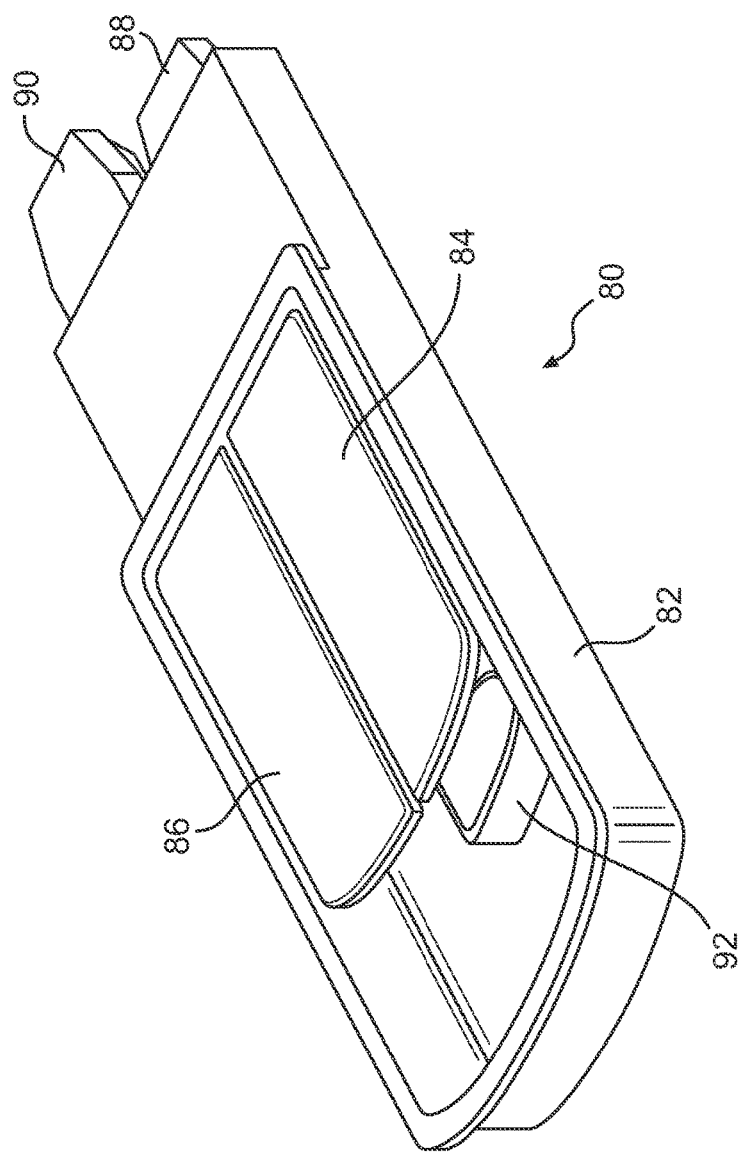
FIG. 10 is another perspective of the latch shown in FIG. 8, with the indicator in a revealed position.

FIG. 10 is another perspective illustration of the latch 80. In this view, the first locking bolt 88 is shown in the retracted position. As such, the indicator 92 is revealed from beneath the first lever 84. Since the first locking bolt 88 is in a retracted position, and the second locking bolt 90 is in an extended position, the latch 80 is in a partially locked condition.

Figure 11:
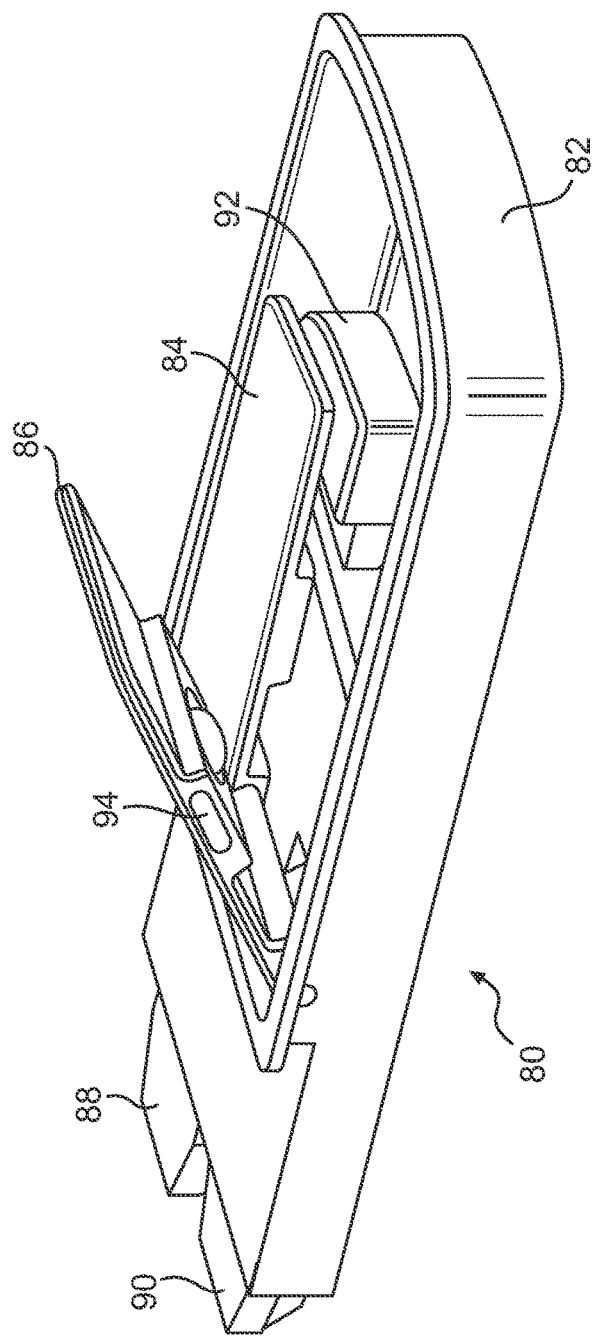
FIG. 11 is a perspective illustration of the latch shown in FIG. 8, with one of the levers in the opened position.

FIG. 11 is a perspective illustration of the latch 80, where the second lever 86 is illustrated in an opened position. As such, consistent with the discussion of the operation of the latch 10, the second locking bolt 90 is in the retracted position. In this drawing, the first locking bolt 88 is in the extended (or locked) position and the indicator 92 is concealed beneath the first lever 84.

FIG. 11 shows a further feature of the latch 80. In this drawing, a second indicator 94 is shown beneath the second lever 86. The second indicator 94 provides a further way to indicate that the latch 80 is in at least a partially opened condition. It is noted that the second indicator 94 is not needed to practice this embodiment of the present invention.

Figure 12:
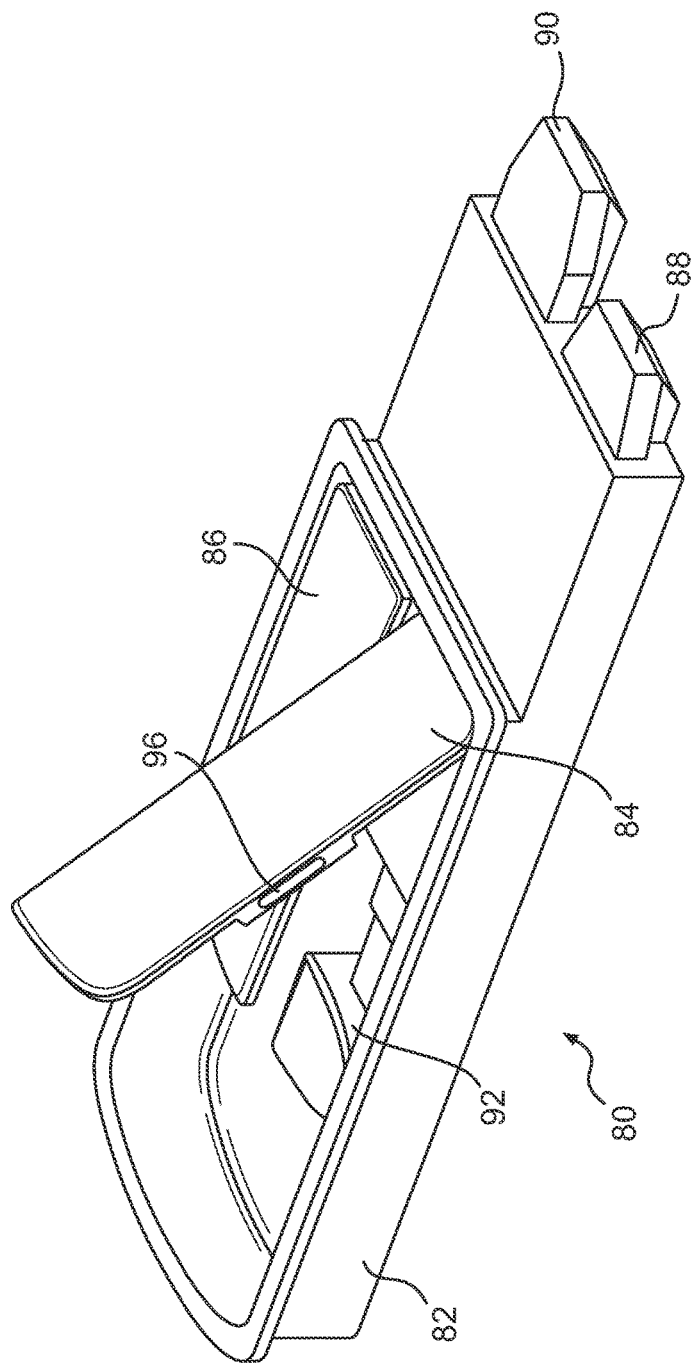
FIG. 12 is a perspective illustration of the latch shown in FIG. 8, with the other of the levers in the opened position.

FIG. 12 is another perspective illustration of the latch 80 of the present invention. In this drawing, the first lever 84 is shown in an opened condition. Therefore, the first locking bolt 88 is in a retracted condition. This drawing also includes a first indicator 96 that provides a further way to show that the latch 80 is in a partially opened condition.

It is noted that the embodiments of the present invention contemplated that the indicator 30, 76, 92 is revealed when the latch 10, 70, 80 is in the partially opened condition. In this embodiment, as discussed above, the indicator 30, 76, 92 is concealed with the latch 10, 70, 80 is in the fully locked condition. In another mode of operation, it is contemplated that the indicator 30, 76, 92 may be provided such that it is revealed when the latch 10, 70, 80 is in the fully locked condition. In this mode of operation, the indicator will be concealed when the latch 10, 70, 80 is in the partially locked condition.

Figure 13:
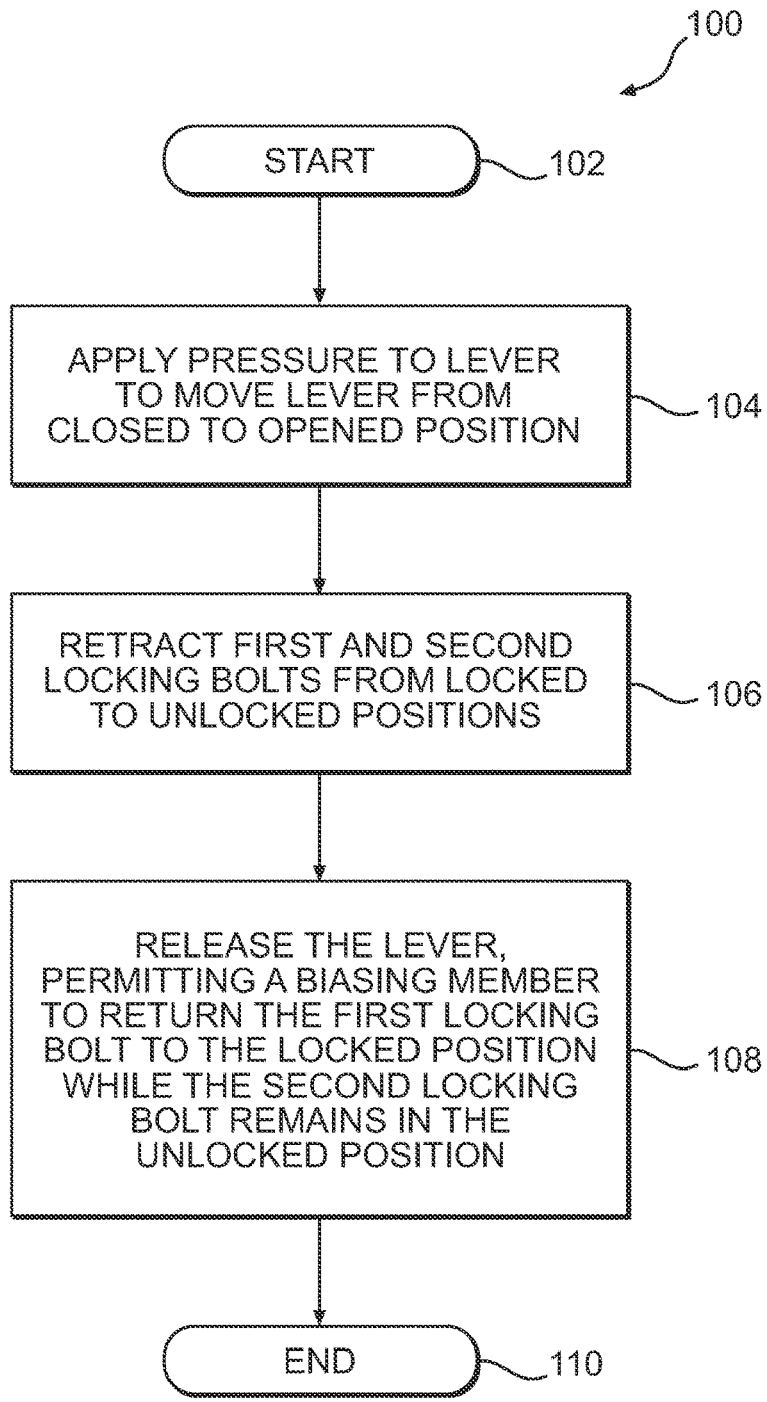
FIG. 13 is a flow chart detailing a method of operation of a latch according to the present invention.

FIG. 13 is a flow chart detailing one contemplated method 100 according to the present invention.

The method starts at step 102. The method proceeds to step 104, where pressure is applied to a lever to move the lever from a closed position to an opened position. From step 104, the method proceeds to step 106, where, by operation of the lever, the first and second locking bolts are released from locked positions to unlocked positions. The method then proceeds to step 108, where, upon releasing the lever, a biasing member returns the first locking bolt to the locked position while the second locking bolt remains in the unlocked position. The method ends at step 110.

Other variations of the method 100 also are contemplated to fall within the scope of the present invention, as should be apparent to those skilled in the art.

As noted above, the present invention has been described in connection with one or more embodiments. The embodiments described are meant to be illustrative of the scope of the invention and not be limiting of the invention. From the discussion herein, it is contemplated that those skilled in the art will appreciate numerous equivalents and variations of the embodiments described. Those equivalents and variations are intended to be encompassed by the present invention as though described herein.

What is claimed is:

1. A latch, comprising:
   a first, biased locking bolt movable between a first, extended position and a first, retracted position, wherein the first, biased locking bolt is biased into the first, extended position;
   a second, unbiased locking bolt movable between a second, extended position and a second, retracted position, wherein the second, unbiased locking bolt is able to remain in the second, retracted position while the first, biased locking bolt is biased into the first, extended position; and
   an actuation device operatively connected to both the first, biased locking bolt and the second, unbiased locking bolt such that when the first, biased locking bolt is in the first, extended position and the second, unbiased locking bolt is in the second, extended position, actuation of the actuation device from a first position to a second position moves both the first, biased locking bolt into the first, retracted position and the second, unbiased locking bolt into the second, retracted position,
   wherein a locking indicator is disposed on the second, unbiased locking bolt, the locking indicator being concealed by a lever of the actuation device when the second, unbiased locking bolt is in the second, extended position and the actuation device is in the first position.

2. The latch of claim 1, wherein the second, unbiased locking bolt is movable manually from the second, retracted position to the second, extended position.

3. The latch of claim 2, wherein the second, unbiased locking bolt is movable manually from the second, retracted position to the second, extended position by application of pressure thereto.

4. The latch of claim 3, further comprising:
   a housing containing the first, biased locking bolt and the second, unbiased locking bolt.

5. The latch of claim 4, wherein a biasing member is connected between the first, biased locking bolt and the housing.

6. The latch of claim 4, wherein the first, biased locking bolt extends through the housing when in the first, extended position and the second, unbiased locking end extends through the housing when in the second, extended position.

7. The latch of claim 4, wherein the housing is cup shaped.

8. The latch of claim 1, further comprising:
a biasing member connected to the first, biased locking bolt to bias the first, biased locking bolt into the first, extended position.

9. The latch of claim 8, wherein the biasing member is a spring.

10. The latch of claim 8, wherein release of the actuation device from the second position permits the biasing member to return the first, biased locking bolt to the first, extended position.

11. The latch of claim 1, wherein the locking indicator is visible when the second, unbiased locking bolt is in the second, retracted position.

12. The latch of claim 11, wherein the second, unbiased locking bolt comprises a locking end and an interior end, the locking indicator being disposed on the interior end.

13. The latch of claim 1, wherein the first position of the actuation device is a closed position and the second position of the actuation device is an opened position of the lever.

14. The latch of claim 13, wherein the lever conceals the locking indicator disposed on the second, unbiased locking bolt when the second, unbiased locking bolt is in the second, extended position and the lever is in the closed position.

15. The latch of claim 14, wherein the locking indicator is revealed from beneath the lever when the second, unbiased locking bolt is in the second, retracted position and the lever is in the closed position.

16. The latch of claim 1, wherein the actuation device comprises the lever connected to the second, unbiased locking bolt and a second lever connected to the first, biased locking bolt.

17. The latch of claim 1, wherein the first, biased locking bolt and the second, unbiased locking bolt are disposed adjacent to one another in a substantially parallel relationship.

18. An aircraft storage compartment, comprising:
a frame;
a door; and
a latch for releasably securing the door to the frame in a closed position, the latch comprising:
a first, biased locking bolt movable between a first, extended position and a first, retracted position, wherein the first, biased locking bolt is biased into the first, extended position;
a second, unbiased locking bolt movable between a second, extended position and a second, retracted position, wherein the second, unbiased locking bolt is able to remain in the second, retracted position while the first, biased locking bolt is biased into the first, extended position; and
an actuation device operatively connected to both the first, biased locking bolt and the second, unbiased locking bolt such that when the first, biased locking bolt is in the first, extended position and the second, unbiased locking bolt is in the second, extended position for securing the door to the frame, actuation of the actuation device from a first position to a second position moves both the first, biased locking bolt into the first, retracted position and the second, unbiased locking bolt into the second, retracted position for enabling opening of the door in relation to the frame,
wherein a locking indicator is disposed on the second, unbiased locking bolt, the locking indicator being concealed by a lever of the actuation device when the second, unbiased locking bolt is in the second, extended position and the actuation device is in the first position.

19. A method of operating a latch comprising a first, biased locking bolt movable between a first, extended position and a first, retracted position, wherein the first, biased locking bolt is biased into the first, extended position; a second, unbiased locking bolt movable between a second, extended position and a second, retracted position wherein the second, unbiased locking bolt is able to remain in the second, retracted position while the first, biased locking bolt is biased into the first, extended position; and an actuation device operatively connected to both the first, biased locking bolt and the second, unbiased locking bolt such that actuation of the actuation device from a first position to a second position moves both the first, biased locking bolt into the first, retracted position and the second, unbiased locking bolt into the second, retracted position, wherein a locking indicator is disposed on the second, unbiased locking bolt, the locking indicator being concealed by a lever of the actuation device when the second, unbiased locking bolt is in the second, extended position and the actuation device is in the first position, wherein the method comprises:
manipulating the actuation device from the first position to the second position;
by operation of the actuation device to the second position, retracting the first, biased locking bolt from the first, extended position to the first, retracted position and also retracting the second, unbiased locking bolt from the second, extended position to the second, retracted position; and
releasing the actuation device, permitting the first, biased locking bolt to return to the first, extended position while the second, unbiased locking bolt remains in the second, retracted position.

20. The method of claim 19, further comprising:
applying pressure to the second, unbiased locking bolt to move the second, unbiased locking bolt from the second, retracted position to the second, extended position.

21. The method of claim 19, further comprising:
making visible the locking indicator when the second, unbiased locking bolt is in the second, retracted position.

22. The method of claim 21, further comprising:
concealing the locking indicator when the second, unbiased locking bolt is in the second, extended position.

23. The method of claim 21, further comprising:
applying pressure to the locking indicator to move the second, unbiased locking bolt from the second, retracted position to the second, extended position.

24. The method of claim 19, wherein:
the actuation device comprises a lever, the first position of the lever being a closed position and the second position of the lever being an opened position; and
manipulating the lever from the closed position to the opened position comprises lifting the lever.

25. The method of claim 24, wherein:
the latch further comprises a biasing member connected to the first, biased locking bolt to bias the first, biased locking bolt into the first, extended position; and
the biasing member causes the first, biased locking bolt to return to the first, extended position after releasing the lever.

26. The method of claim 25, wherein:
the biasing member causes the lever to return to the closed position after releasing the lever.

27. The method of claim 25, wherein the biasing member is a spring.

* * * * *